(12) United States Patent
Downing et al.

(10) Patent No.: US 8,185,681 B2
(45) Date of Patent: May 22, 2012

(54) DOCKING STATION

(75) Inventors: Bart M. Downing, Spring, TX (US);
Jeffrey A. Lev, Tomball, TX (US);
Mark S. Tracy, Tomball, TX (US);
David W. Cawthon, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 36 days.

(21) Appl. No.: 12/484,383

(22) Filed: Jun. 15, 2009

(65) Prior Publication Data

US 2010/0318710 A1 Dec. 16, 2010

(51) Int. Cl.
*G06F 13/00* (2006.01)
(52) U.S. Cl. ....................... 710/304; 361/679
(58) Field of Classification Search .......... 710/301–304, 710/305–306, 100; 361/679; 455/575.1
See application file for complete search history.

(56) References Cited

U.S. PATENT DOCUMENTS

| | | | |
|---|---|---|---|
| 5,889,964 A * | 3/1999 | Cho et al. | 710/304 |
| 6,188,572 B1 * | 2/2001 | Liao et al. | 361/679.42 |
| 7,038,908 B2 | 5/2006 | Usui et al. | |
| 7,417,855 B2 | 8/2008 | Carnevali | |
| 7,511,954 B2 | 3/2009 | Tsai et al. | |
| 2001/0030851 A1 * | 10/2001 | Usui et al. | 361/687 |
| 2005/0146847 A1 * | 7/2005 | Hara et al. | 361/683 |
| 2008/0100995 A1 * | 5/2008 | Ryder et al. | 361/679 |

* cited by examiner

*Primary Examiner* — Brian Misiura
*Assistant Examiner* — Kim Huynh
(74) *Attorney, Agent, or Firm* — Reed J. Hablinski

(57) ABSTRACT

A docking station for a computing device can include an interface for electrically connecting the docking station to a computing device. The interface may supply power from a power supply. The docking station can include a surface for attaching a pin, wherein the location of the pin prevents a computing device from electrically connecting to the docking station if the computing device is not compatible.

20 Claims, 4 Drawing Sheets

DOCKING STATION

BACKGROUND

Docking stations and port replicators provide a way of interfacing a portable computer to common computer peripherals. The use of a docking station enables a portable computer to become a substitute for a desktop computer, without sacrificing the portability of the machine. The docking station for a computer is a unit that may contain a power connection, expansion slots, and connection to peripherals, such as a monitor, printer, full-sized keyboard, mouse and a network connection for the computer. A docking station may allow users the convenience of using such peripherals as a larger monitor and a full sized keyboard by connecting a computer to the docking station and connecting a cable for each peripheral to the docking station.

BRIEF DESCRIPTION OF THE DRAWINGS

Some embodiments of the invention are described with respect to the following figures.

DETAILED DESCRIPTION

Figure 1:
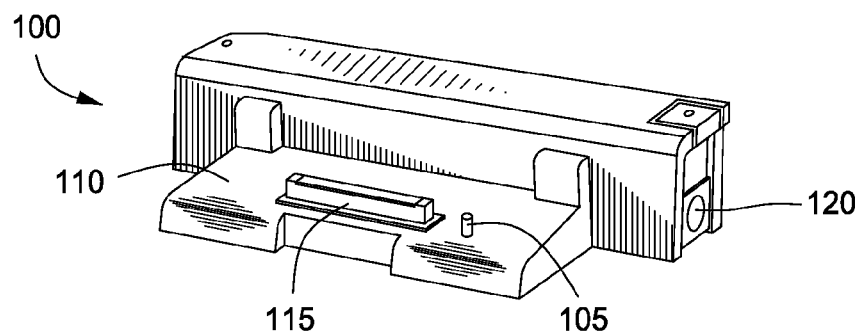
FIG. 1 is a device according to an exemplary embodiment of the invention.

Docking stations can interface with computers that may include different components and an interface that is compatible with a docking station. A docking station may work with more than one computer model that physically attaches to the docking station, interfaces with ports on the docking station and receives power from the docking station.

A computer may be attached to a docking station that does not support all of the components of the computer or the computer does not support the components of the docking station. For example, if the docking station has a serial port the computer connected to the docking station may not support the serial port and the port on the docking station cannot communicate between a peripheral connected to the serial port and the computer connected to the docking station. The computer may include a component that is not supported by the docking station. For example the computer may include a serial port for communicating with a peripheral and the docking station may not have a serial port that is compatible with the peripheral even though the interface on the computer can connect to the interface on the docking station. If peripherals begin not to support a component that is included in a computer that component may be removed to include a component that the peripherals support.

Adding a component to the computer may increase the power usage of the computer compared to a computer without component. For example, a computer may include a processor that operates at a frequency that uses an amount of power and a second computer with a processor that operates at a different frequency and uses a different amount of power. The docking station may include components such as a hub to connect multiple peripherals, lights, and a motor that require power to function. The power supply for the docking station may be required to power the docking station's components but also power the computer and recharge the battery of the computer.

An alignment pin may be included on a docking station for aligning the interface of the computer with the interface of the docking station and prevents computers that include a different interface from trying to connect to the docking station and damaging the docking station or the computer. Computers with the same type of interface as the interface on the docking station can connect to the docking station but may not include compatible components or the docking station may not be able to supply power to all of the components of the computer or the docking station.

In one embodiment of the invention, the location of the pin on the docking station can be determined according to the components of the computer that can be powered by the docking station. For example each docking station has a power supply rating and the power supply rating of the power supply can determine the location of the pin. If the computer has a corresponding opening, to the pin on the docking station, the computer can connect and the components of the computer and the docking station can be powered by the power supply. If the computer does not include an opening that aligns with the pin the computer cannot interface with the docking station.

Manufacturing a different docking station for computers with different components to interface with the docking station would be inefficient. The docking station may include an opening on the surface of the dock for installing a pin corresponding to the components.

In some embodiments, the power supply transmits an ID signal to the computer or the docking station. The identification signal identifies the model of the power supply. If the power supply ID signal is received by the docking station through the power supply connector then the docking station will transmit the ID a signal to the computer through the interface. The computer can include a table that identifies the power supplies that are compatible with the computer to allow the components of the computer to receive power from the power supply. In some embodiments, a power supply may be listed as compatible on in the table stored in the computer but the computer may use more power than the power supply can provide. For example if the computer has components that use more than 65 W and the power supply is rated for only 65 W then the computer may turn off some of the components so that other components can receive power from the 65 W power supply.

With reference to the figures, FIG. 1 is a device according to an exemplary embodiment of the invention. The device can be a docking station 100 for connecting to a computer. The docking station may include a surface 110. A pin 105 may be attached to the surface to prevent a computer from interfacing with the docking station 100.

In one embodiment, the surface 110 may include an interface 115. The interface can electrically connect the docking station 100 to a computer. The interface 115 may supply power to the computer if the interface 115 of the docking station 100 is connected to the computer. The interface 115 can be coupled to ports on the docking station 100. The ports on the docking station can correspond to the ports on the portable computer. For example the portable computer may include a serial port, a network, and a display port and the docking station 100 may also include a serial port, a network and a display port. The docking station 100 can be connected to a keyboard and mouse, a network, and a monitor for example. The computer can connect to the interface 115 on the docking station 100 to communicate with the keyboard and mouse, the network, and the monitor. In some embodiments, the docking station 100 can include additional interfaces for connecting to components of the computer such as an interface for transmitting power and another interface for connecting the computer to the ports of the docking station.

The interface 115 may include connections for ports that are no longer on the docking station 100. For example the interface 115 may include a portion for connecting a computer to a serial port; however the docking station 100 may not include a serial port. The removal of the serial port may change the power requirements of the docking station 100 if the serial port is not powered component of the docking station 100.

The docking station 100 can include a connector 120 for connecting a power supply to the docking station 100. The different ports, lights and other components of the docking station 100 received power from the power supply. The power supply connector 120 also connects to the interface 115 to supply power to a computer. The docking station can connect to power supplies of different power ratings. For example a docking station may have a rating of 65 watts or 90 watts. A component that is powered on the docking station has a power usage rating indicating the amount of power the component uses. All the components together cannot use more power than the power supply rating or the power supply may shut off, become damaged, or cause a failure or fire from overloading. For example if all of the components when powered used more than 65 W and the power supply rating is 65 W then the power supply may be damaged.

In some embodiments, the components of the computer are included in the determination of an adequate power supply rating to power the components of the docking station and the components of the computer. To prevent the computer that has components that use power above the power supply rating a pin 105 is added to the surface. The location of the pin 105 indentifies the power supply rating. For example, the docking station 100 may include two pin locations and one of the pin locations identifies a 65 W power supply and the other location identifies a 90 watt power supply. In one embodiment, the absence of a pin may identify the power supply rating. In one embodiment, the docking station 100 may include additional pins for aligning the interface 115 of the docking station with the interface of a computer.

Figure 2:
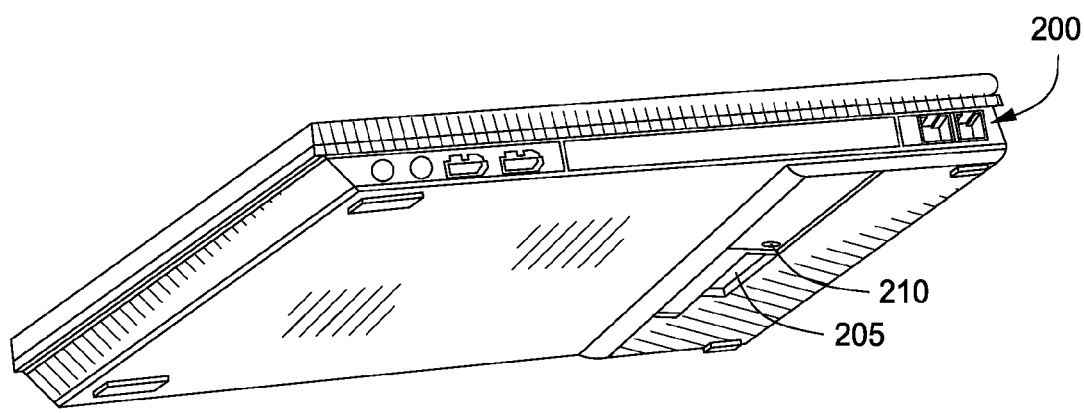
FIG. 2 is a system according to an exemplary embodiment of the invention

FIG. 2, is a system according to an exemplary embodiment of the invention. The system 200 can be a portable computer including an interface 205 and the opening 210. The interface 205 can connect the computer 200 electrically to ports on the docking station. The interface 205 can also receive power from the docking station to power the components of the computer. In one embodiment the power received through the interface also charges the battery.

The opening 210 can accept a pin located on the docking station. The location of the opening on the computer can represent the power requirements of the components of the computer. The opening may include one location if the computer has a first set of components and the opening may include a second location if the computer has a second set of components. For example, a first set of components may not include a wireless connection and a second set of components may include the wireless connection. The wireless connection uses power causing a computer with a first set of components to use less power than a computer with a second set of components. Examples of components in the portable computer that may use power of different amounts according to the specification of the component are the display, display controller, hard disk drive, ports, optical disk drives, indicators, and the processor however other components in the portable computer may cause additional power to be used. A processor with a processor frequency of 3 GHz may use more power than a processor with a processor frequency of 2.5 GHz, for example.

In one embodiment, the absence of an opening may also indicate a power usage for the portable computer. The opening on the computer may be filled with a plug to indicate the power usage of the computer. In some embodiments, the plug is inserted in the opening and the plug may not be removed. If the plug is not removable, a user cannot enable the computer to connect to the docking station that had a pin that prevents the computer interface from connecting to the docking station interface if the plug prevented the pin from entering the opening.

Figure 3:
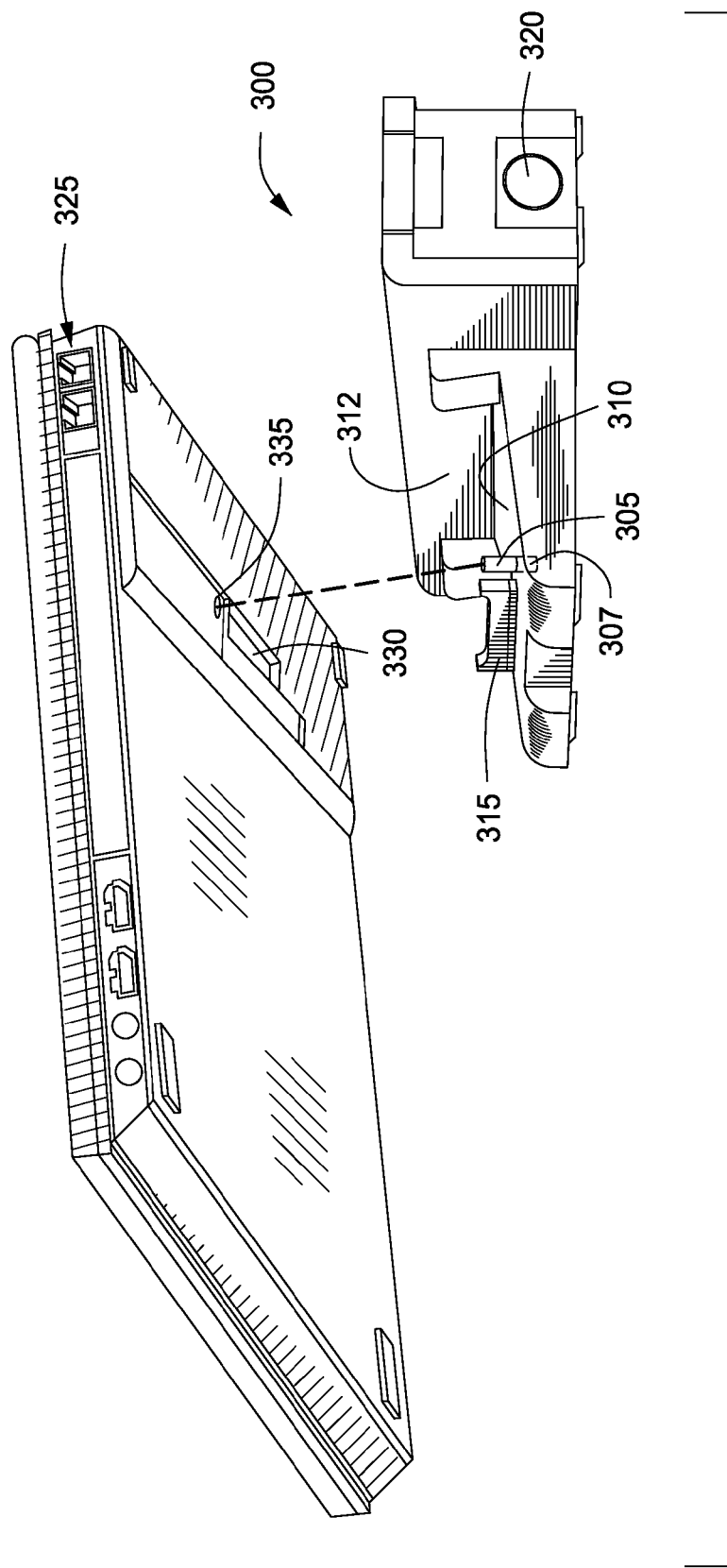
FIG. 3 is a system and a device according to an exemplary embodiment of the invention

FIG. 3 is a system and a device according to an exemplary embodiment of the invention. A docking station 300 includes an interface 315 and a pin 305. The interface 315 on the docking station can electrically connect to the interface 330 on the computer 325. The pin 305 can be aligned with the opening 335. If the alignment of the pin 305 to the interface 315 is different from the alignment of the opening 335 to the interface 330 the pin 305 will not enter the opening 335. The top of the pin will contact the bottom of the computer 325 preventing the interface 315 on the docking station 300 from connecting to the interface 330 on the computer 325. In one embodiment, the computer 325 has an opening 335 on a different surface than the interface 330, and the docking station 300 has the pin 305 attached to a surface 310 and the interface 315 attached to the second surface 312. For example the interface may be on the back of the computer and the opening may be on the bottom of the computer.

In one embodiment, the docking station may not include the pin 305 attached to the surface, the absence of the pin may indicate the highest power supply rating. If there is no pin attached to the surface of the docking station 300 the components of the computer 325 with an interface 330 that can connect to the interface 315 of the docking station 300 receive power from the docking station 300. In one embodiment, a computer 325 may include an opening and another computer with additional components that use power may not include an opening. The absence of a pin can allow a computer having the first power usage to connect to the docking station 300 and allow a computer having a second that may be less than the first power usage to connect to the docking station 300. The addition of a pin 305 may allow a computer with a first power usage to interface with the docking station and prevent a computer with a power usage more than the first power usage from interfacing with the docking station 300. An opening 307 on the surface 310 may receive the pin 305 which is not removable from the opening 307, in one embodiment.

In some embodiments, the size or the shape of the pin may prevent some computers from a attaching to the docking station while allowing other computers to attach to the docking station. The computer may include an opening that is a first size and will allow a pin into the opening that is equal to less than the size of the opening preventing computers with openings smaller than the size of the pin from interfacing with the docking station. In one embodiment, the shape of the pin may prevent the computer with a different shape opening from interfacing with the docking station. For example the pin can have a square cross section and the opening on the computer may include a circular opening. In another embodiment, the length of the pin may prevent a computer from interfacing with the docking station. For example if the length of the pin on the docking station is greater than the depth of the opening on the computer then the opening may not allow the length of the pin to be inserted in the opening and prevent the interface of the computer from connecting to the interface of the docking station.

The power connector 320 can connect a power supply to the docking station 300. The power supply rating of the power supply can correspond to the location of the pin 305 on the surface of the docking station 300, the size of the pin, the shape of the pin or the length of the pin.

Figure 4A:
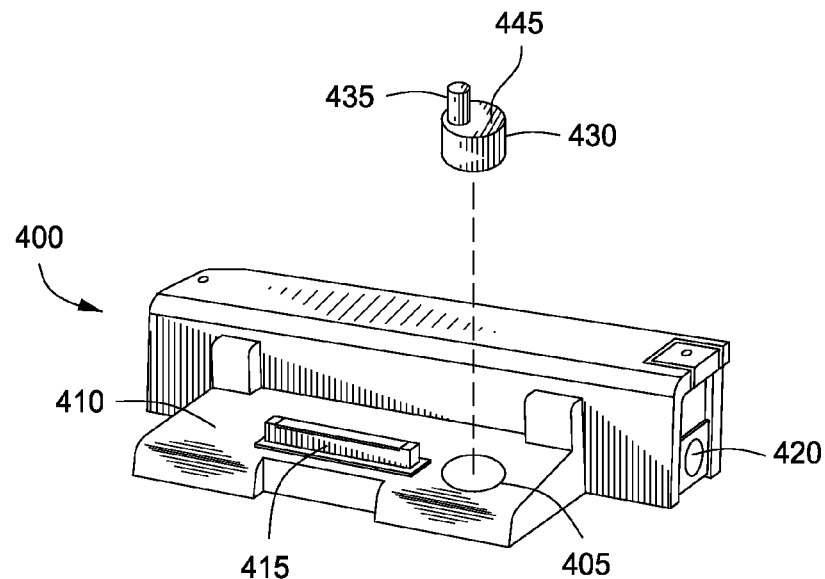
FIG. 4A is a device according to an exemplary embodiment of the invention.

FIG. 4A is a device according to an exemplary embodiment of the invention. The device may be a docking station 400. The docking station may include a surface at 410 with an interface 415. The surface of the docking station can include a cavity 405. The cavity 405 can accept an insert 430 that includes a pin 435.

If the docking station interface 415 can interface with a computer interface on a computer including different types of components the docking station 400 may include a pin 435 that prevents the computer from interfacing with the docking station 400. For example, a computer may be able to connect with the docking station through the interface 415 if the computer has an opening that aligns with the pin 435. Another computer may be able to connect with the interface 415 on the docking station 400 but the opening on the computer is relocated for a component that was changed in the computer or added to the computer, for example. The manufacturer of the docking station or the computer can change the location of the pin 435 by changing the insert 430.

In one embodiment the cavity 405 is circular and the insert 430 is also circular. The insert can rotate to an infinite number of positions within the cavity 405. If the location of the pin 435 is determined the insert can be locked in place to prevent the docking station from being used with an incompatible computer. In one embodiment, the insert is rotated and then installed in the cavity. A tool can install the insert in the cavity to align with the location for the opening on a computer. If the insert is installed in the cavity 405 of the docking station 400 the insert surface 445 of the insert 430 may be in the same plane as the surface 410 of the docking station 400.

Figure 4B:
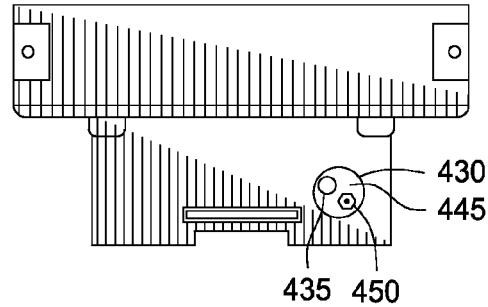
FIG. 4B is a device according to an exemplary embodiment of the invention.

In FIG. 4B the insert 430 is installed in the cavity. The insert 430 can be rotated in either direction. The rotation of the insert 430 can move the pin 435 into a location that aligns with computers compatible with the docking station. In some embodiments the insert cannot be rotated after the pin 435 is in the location to prevent the docking station from being enabled to interface with a computer that is not compatible with the docking station. A fastener 450 can be included to prevent the insert from rotating. In one embodiment, the fastener 450 may be a screw or a rivet. If the fastener 450 is a screw then the screw may have a head to prevent removal of the screw.

Figure 4C:
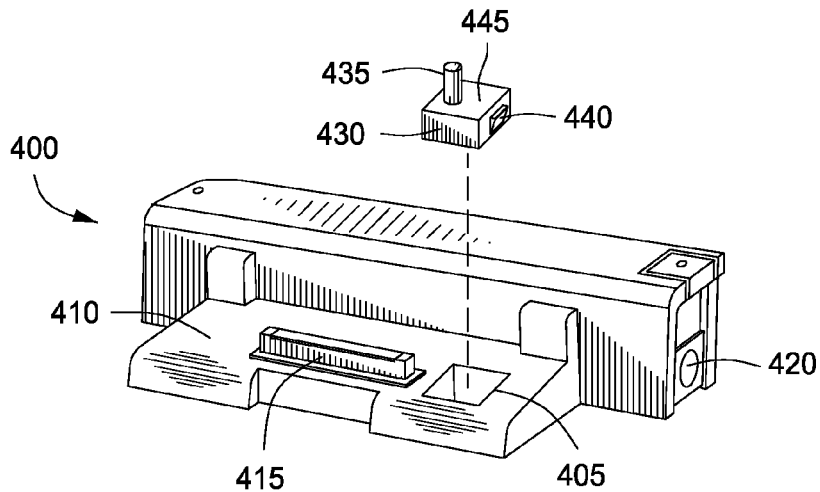
FIG. 4C is a device according to an exemplary embodiment of the invention.

In FIG. 4C the cavity 405 is square and the insert is also a square. If the insert is square the insert can be rotated 90 degrees into four possible positions prior to inserting in the cavity. The four possible positions of the insert can change the location of the pin to four possible locations. The docking station 400 or the insert 430 may include a fastener 440 to prevent the removal of the insert 430 from the cavity 405.

The shape of the cavity 405 and if the insert 430 are not limited to being circular, square, rectangular, triangular, oval but may be any shape. In some embodiments, the insert may only be a portion of the shape of the cavity. For example the cavity 405 may be circular and the insert 430 may be pie shaped.

The power connector 420 allows a power supply to connect to the docking station 400. The power supply connected to the power connector 420 can include a power supply rating for powering the components of the computer based on the location of the pin attached to the insert 430 in the cavity 405.

Figure 5:
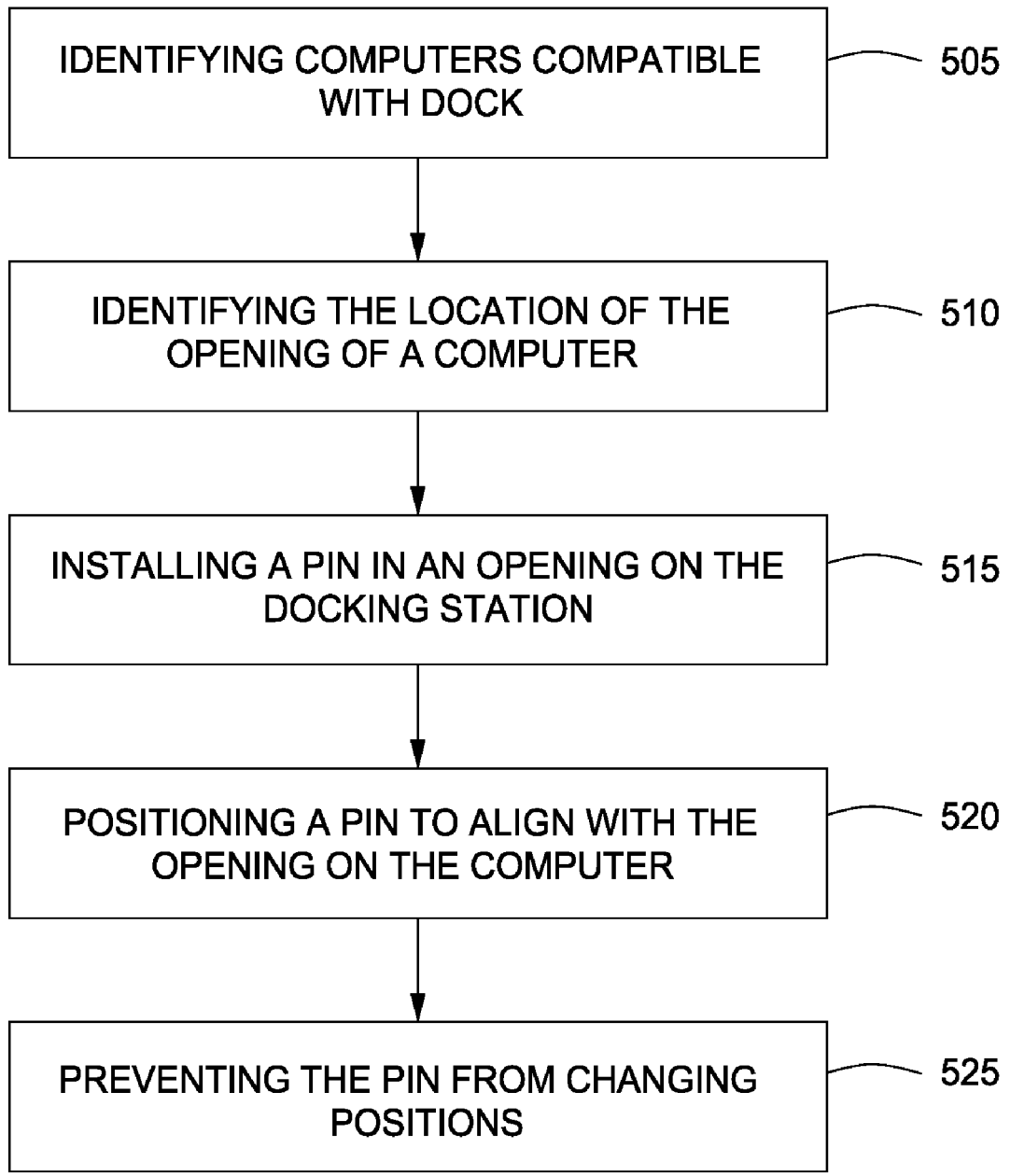
FIG. 5 is a flow chart according to an exemplary embodiment of the invention.

FIG. 5 is flow chart according to an exemplary embodiment of the invention. The method begins with identifying computers compatible with the docking station (at 505). Identifying computers that are compatible with the docking station can include determining if the docking station interface is compatible with the computer interface. Identifying the computers may also include identifying computers that can communicate with the ports on the docking station. Another determination can be if the computer has a power usage that is compatible with the power supply rating of the power supply attached to the docking station.

If the computer is compatible with the docking station a location of an opening on the computer is determined (at 510). The location of the opening on the computer may be determined according to the placement of components within the computer. For example the opening on the computer cannot be where an internal component of the computer would prevent a pin from entering the opening.

As new generations of computer components are designed a computer may be redesigned to incorporate the new generation of components. Incorporation of a new component may prevent the opening on the computer from being located in the same place as an opening on a previous generation computer.

A pin can be installed on the surface of the docking station (at 515). In some embodiments the pin is formed at the same time as the surface that the pin the attaches to. In alternative embodiments the pin's location can be changed according to the opening on the computer. The cavity can accept an insert with the pin. In one embodiment, there are multiple openings on the surface of the docking station and a pin can be inserted into one of these openings.

The pin can be located to aligned with the opening on the computer (at 520). If the surface of the docking station has multiple openings aligning the pin can be by inserting it into one of the openings on the surface. If the surface of the docking station has a cavity the locating of the pin can be by inserting an insert into the cavity wherein the insert includes the pin. If the surface of the docking station includes a cavity positioning the pin may also include rotating the insert until the pin aligns with an opening on the computer. The rotating of the insert to align the pin may be performed before the insert is inserted in the opening or after the insert is inserted in the opening.

After locating the pin the pin is prevented from changing locations (at 525). To prevent the pin from changing locations the pin or the opening on the docking station for accepting the pin may include a fastener 440 to prevent the removal of the pin once the pin is inserted. If the docking station has a cavity for an insert with a pin attached to the insert the docking station or the insert may include a fastener 440 to prevent the removal of the insert from the cavity.

The installing of the pin (at 515) and the positioning of the pin (at 520) may happen in any order. In some embodiments, the insert is inserted into the cavity (at 515) and rotated into position (at 520). In alternative embodiments, the pin is positioned by rotating the insert (at 520) and then the insert is inserted into the cavity (at 515).

In the foregoing description, numerous details are set forth to provide an understanding of the present invention. However, it will be understood by those skilled in the art that the present invention may be practiced without these details.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A docking station for a computing device comprising:
   a connector to electrically connect a power supply to the docking station;
   an interface to electrically connect the docking station to the computing device and to supply power from the connector to the computing device; and
   a pin at a location on a surface of the docking station, wherein the location identifies a power supply rating of the power supply.

2. The docking station for a computing device of claim 1 further comprising a cavity on the surface of the docking station for receiving an insert including the pin.

3. The docking station for a computing device of claim 2 wherein the insert is not removable from the docking station.

4. The docking station for a computing device of claim 2 wherein the insert is rotatable for changing the location of the pin.

5. The docking station for a computing device of claim 4 further comprising a fastener to prevent the insert from rotating in the cavity.

6. The docking station for a computing device of claim 5 wherein the fastener is a screw.

7. The docking station for a computing device of claim 1 further comprising an opening in the surface for receiving the pin.

8. The docking station for a computing device of claim 7 wherein the pin is not removable from the opening.

9. The docking station for a computing device of claim 1 further comprising a power supply to connect to the docking station, wherein the power supply rating is determined by the location.

10. The computer docking station of claim 1 further comprising a second surface, wherein the interface is attached to the second surface.

11. A docking station comprising:
    a cavity in a surface of the docking station to accept an insert;
    the insert includes an insert surface and a pin, wherein the location of the pin permits a computing device to interface with the docking station; and
    a power supply with a power supply rating indentified by the location of the pin.

12. The docking station of claim 11 further comprising an interface, attached to the surface, to supply power from a power supply to the computing device.

13. The docking station of claim 11 further comprising a fastener to prevent the removal of the insert.

14. The docking station of claim 11 wherein the insert rotates in the cavity.

15. The docking station of claim 14 further comprising a fastener to prevent the insert from rotating.

16. A method comprising:
    installing a pin in an opening on a surface of a docking station for identifying a computer compatible with the docking station, wherein the docking station electrically connects to the computer if a location of the pin aligns with an opening on the computer; and
    preventing a change to the location.

17. The method of claim 16 further comprising rotating an insert for positioning the pin.

18. The method of claim 16 further comprising rotating a tool to position the pin on the surface.

19. The method of claim 16 further comprising preventing a power supply from supplying power to the computer if the computer is not compatible.

20. A docking station for a computing device comprising:
    a connector to electrically connect an external power supply to the docking station;
    an interface separate from the connector, on a surface of the docking station, to electrically connect the docking station to the computing device and to supply power, received by the docking station from the connector, to the computing device; and
    a pin at one of a plurality of locations on the surface of the docking station, wherein each of the plurality of locations of the pin on the surface identifies one of a plurality of power supply ratings of a power supply connected to the connector.

* * * * *

UNITED STATES PATENT AND TRADEMARK OFFICE
CERTIFICATE OF CORRECTION

| | | |
|---|---|---|
| PATENT NO. | : 8,185,681 B2 | Page 1 of 1 |
| APPLICATION NO. | : 12/484383 | |
| DATED | : May 22, 2012 | |
| INVENTOR(S) | : Bart M. Downing et al. | |

It is certified that error appears in the above-identified patent and that said Letters Patent is hereby corrected as shown below:

In column 7, line 39, in Claim 10, delete "computer docking station of" and insert -- docking station for a computing device of --, therefor.

In column 8, line 4, in Claim 11, delete "indentified" and insert -- identified --, therefor.

Signed and Sealed this
Fourth Day of December, 2012

David J. Kappos
*Director of the United States Patent and Trademark Office*